H. GRIFFING.
Screw-Cutting Die-Plate.
No. 161,679. Patented April 6, 1875.
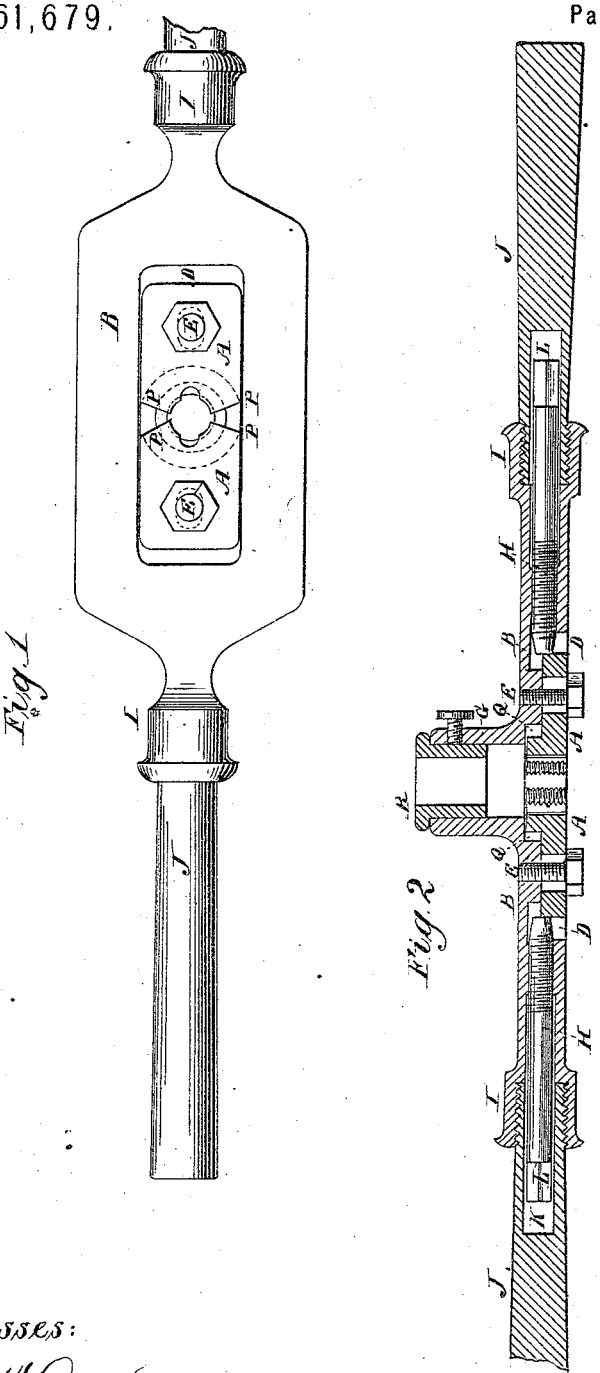

UNITED STATES PATENT OFFICE.

HORACE GRIFFING, OF NEW HAVEN, CONNECTICUT.

IMPROVEMENT IN SCREW-CUTTING DIE-PLATES.

Specification forming part of Letters Patent No. 161,679, dated April 6, 1875; application filed July 18, 1874.

*To all whom it may concern:*

Be it known that I, HORACE GRIFFING, of New Haven, in the county of New Haven and State of Connecticut, have invented a new and Improved Die-Plate, of which the following is a specification:

My invention relates to die-plates for cutting threads on gas and steam pipe; and it consists of two separate or independent dies fitted in a recess or recesses in the side of the plate by being boxed or halved thereto and bolted fast, so that they can be readily taken off by removing the bolts or the nuts, by which they are more readily removed for changing and sharpening than the common divided dies are. The dies are provided with slotted holes for the passage of the bolts by which they are fastened to the plate or holder to allow them to be adjusted to suit the size of the pipe to be cut. My invention also consists of screws for adjusting the dies, fitted in hollow handles, which are also jointed near the plate, and the detachable portions have a socket in the end to receive the projecting shank of the screw when screwing into the portion formed on the plate.

Figure 1 is a plan view of a die-plate constructed according to my invention. Fig. 2 is longitudinal section of the same.

Similar letters of reference indicate corresponding parts.

A represents the dies; B, the solid plate. The plate is recessed half its thickness, as shown at D, to receive the dies; and the dies are also recessed or halved a little back of the cutting end to fit in said recess flush with the surface, and they are bolted fast by bolts E, the holes for the bolts being slotted to allow them to be adjusted to center with the guide G, which is formed together with the plate. H represents the adjusting-screws for setting up the dies. They screw in through the plate from the handle, which is made in detachable parts which screw together at I, and the detachable portion J has a socket, K, to make room for the projecting shank L of the screw, to which a wrench is applied for turning it. The dies are beveled on the outer corners P, so that they may be sharpened by grinding off said corners.

These dies may be very simply and cheaply made in the form required for connecting them to the plate in this way by stamping them in dies.

The solid die-plate is recessed a little deeper in the middle portion Q than in the other part, to make room for the thicker portion of the dies.

The guides may be provided with detachable bushes R for pipes of different sizes.

Having thus described my invention, I claim as new and desire to secure by Letters Patent—

1. In a screw-plate for cutting pipe, the combination of the detachable and adjustable slotted dies A A and fastening-bolts E E with the recessed holder B, pipe-guide G, adjusting-screws H, and handles J, substantially as herein described, for the purpose set forth.

2. The combination, with the frame B, provided with socket I, of the screw H and screw-threaded hollow handle J, substantially as herein described, for the object set forth.

HORACE GRIFFING.

Witnesses:
 ADOLPH ASHER,
 H. W. ASHER.